(12) United States Patent
Mack et al.

(10) Patent No.: US 8,310,663 B2
(45) Date of Patent: Nov. 13, 2012

(54) METHODS AND SYSTEMS FOR CALIBRATING AN ADJUSTABLE LENS

(75) Inventors: Newton Eliot Mack, Venice, CA (US); Philip R. Mass, Portland, OR (US)

(73) Assignee: Lightcraft Technology, LLC, Venice, CA (US)

( * ) Notice: Subject to any disclaimer, the term of this patent is extended or adjusted under 35 U.S.C. 154(b) by 190 days.

(21) Appl. No.: 12/832,480

(22) Filed: Jul. 8, 2010

(65) Prior Publication Data

US 2011/0026014 A1   Feb. 3, 2011

Related U.S. Application Data

(60) Provisional application No. 61/230,270, filed on Jul. 31, 2009.

(51) Int. Cl.
*G01B 9/00* (2006.01)
(52) U.S. Cl. ........................................................ 356/124
(58) Field of Classification Search .................... 356/124
See application file for complete search history.

(56) References Cited

U.S. PATENT DOCUMENTS

| 5,085,502 A * | 2/1992 | Womack et al. ............... 356/605 |
| 2005/0135857 A1* | 6/2005 | Saund et al. .................... 400/88 |
| 2008/0055598 A1* | 3/2008 | Haaheim ........................ 356/399 |

FOREIGN PATENT DOCUMENTS

| JP | 2004-212213 A | 7/2004 |
| JP | 2007-096964 A | 4/2007 |
| JP | 2009-168461 A | 7/2009 |
| WO | 2004012141 A2 | 2/2004 |

OTHER PUBLICATIONS

International Search Report mailed Feb. 15, 2011 for PCT/US2010/041305.

* cited by examiner

*Primary Examiner* — Tarifur Chowdhury
*Assistant Examiner* — Abdullahi Nur
(74) *Attorney, Agent, or Firm* — Mark S. Leonardo; Brown Rudnick LLP (57) ABSTRACT

A system for calculating intrinsic properties and an entry pupil location of an adjustable camera lens is disclosed. The system includes a camera and a calibration target. Methods for calculating intrinsic properties and an entry pupil location of an adjustable camera lens are also disclosed.

19 Claims, 5 Drawing Sheets

METHODS AND SYSTEMS FOR CALIBRATING AN ADJUSTABLE LENS

CROSS-REFERENCE TO RELATED APPLICATIONS

This patent application claims priority to U.S. Provisional Patent Application Ser. No. 61/230,270, filed in the United States Patent and Trademark Office on Jul. 31, 2009, the entire contents of which is incorporated herein by reference.

TECHNICAL FIELD

The invention relates to systems and methods for combining real scene elements from a video, film, or digital type camera with virtual scene elements from a virtual camera into a finished composite image, and more particularly, to systems and methods for calculating intrinsic properties and an entry pupil location of adjustable camera lenses typically found in motion picture and television production.

BACKGROUND INFORMATION

The state of the art in combining real world imagery with additional imagery from another source is a process that requires considerable precision. One of the most common applications is to combine images generated by a computer with images acquired from a traditional motion picture, video, or digital camera. In order to seamlessly combine the images, the computer generated image must be created using a virtual camera and lens parameters that closely match the optical parameters of the physical camera.

In this type of application, there are two main sets of parameters that must be measured. The external parameters, such as the physical camera's position and orientation in the physical world, are typically called the extrinsic parameters. These parameters can be directly measured using a variety of methods. The other set of parameters are the internal lens optical parameters that typically cannot be measured without disassembling the lens, which is typically undesirable or impossible.

Internal lens optical parameters are typically called the intrinsic parameters, which include the lens' focal length, the optical center of the projected image on the image sensor, and the level of distortion imparted by the camera lens. An additional desired optical parameter is the entry pupil location, which describes where incoming rays are focused to a point by the lens. The location of this point is very important for accurate rendering of a virtual image, as the origin of the virtual camera must be placed precisely where the entry pupil of the physical camera was located for the virtual image's perspective to match the physical image's perspective.

Many methods have been used to calibrate intrinsic lens parameters. These include photographing a 2-D or 3-D calibrated object of known size, and using the correlation between the known points of the calibrated object and the location of these points in the captured digital image to calculate the intrinsic lens parameters. All of these methods share some requirements: the physical size of the object must be known, and the physical positions of the measured object must occur in at least two separate planes in order to separate the effects of focal length (zoom) from the physical proximity of the camera to the object. This requirement is met automatically with a 3-D calibration object, but a 2-D calibration object must be photographed from a variety of angles to provide sufficient information. Typically, at least fifteen separate images of a 2-D calibration target are required for each lens adjustment setting to provide accurate results. Since an adjustable lens must be measured at many places through its adjustment range, this multiple frame requirement makes it very difficult to handle the large number of measurements needed to calibrate adjustable lenses. Additionally, both of these approaches have further problems. 3-D calibrated objects or fixtures of sufficient size and accuracy are difficult to make and store. The typical methods for lens calibration using planar objects are not able to calculate the entrance pupil location of the lens due to the lack of information about the relative position of the camera and object.

Accordingly, none of the above methods work well for the demands of motion picture and television production, which typically require very rapid equipment calibration and transportation.

SUMMARY OF THE INVENTION

The invention relates to systems and methods for calculating intrinsic properties and an entry pupil location of an adjustable camera lens over an entire range of the lens' motion envelope. Systems and methods according to the invention calculate the intrinsic properties and entry pupil location measurements more rapidly relative to existing systems for calculating such properties. In contrast to existing commercial techniques, the systems and methods according the invention allow cameras and adjustable lenses to be easily portable such that they can match the high mobility requirements of the modern motion picture and television industry without undue delay.

In one aspect, the invention relates to a system for calculating intrinsic properties and an entry pupil location of an adjustable camera lens. The system includes a camera and a calibration target. The camera includes an adjustable lens and is provided for capturing an image. The calibration target has a front surface and includes a fiducial marker disposed along a length of the front surface. The fiducial marker is encoded with an identifier which uniquely identifies a position of the fiducial marker relative to a coordinate system origin. The position of the fiducial marker is used to calculate the intrinsic properties and the entry pupil location of the adjustable lens.

In one embodiment according to this invention, the system comprises an image processor. The image processor can include a central processing unit, a memory connected to the central processing unit, and a video card for processing an image. The image processor can also include at least one algorithm to calculate the intrinsic properties and the entry pupil location of the adjustable camera lens.

In another embodiment according to this invention, the system comprises a mounting system for enabling angular adjustment of the calibration target. The angular adjustment of the calibration target can be made relative to a position of the camera.

In yet another embodiment according to this invention, the intrinsic properties of the adjustable lens can include any one or more of a focal length, a vertical image origin, a horizontal image origin, and a distortion parameter. The position of the fiducial marker can be calculated on a three-dimensional grid. The identifier of the fiducial marker can also be a bar-code type pattern. The system can comprise a plurality of fiducial markers disposed along the length of the front surface, wherein the coordinate system origin is aligned with the axis of the adjustable lens.

The adjustable lens can also include ring members for adjusting any one or more of a focal length, a focus distance, and an iris position. These adjustable lenses can be comprised of sensor members that correspond to each of the ring members to collect data based upon the position of the adjustable lens.

In a second aspect, the invention relates to a method for calculating intrinsic properties and an entry pupil location of an adjustable camera lens. The method includes providing a camera, such as one of the cameras described above, capturing an image, the image including at least one fiducial marker disposed along a length of a front surface of a calibration target, aligning the camera such that the center of the image corresponds with the position of a coordinate system origin, determining the position of the fiducial marker relative to the position of the coordinate system origin, and calculating the intrinsic properties and the entry pupil location of the adjustable lens based upon the position of the fiducial marker. The fiducial marker is encoded with an identifier which uniquely identifies a position of the fiducial marker relative to a coordinate system origin disposed on the calibration target.

In one embodiment according to this aspect of the invention, the method comprises an image processor that includes a central processing unit, a memory connected to the central processing unit, and a video card for processing the image. The image processor can include at least one algorithm to calculate the intrinsic properties and the entry pupil location of the adjustable camera lens.

In another embodiment according to this aspect of the invention, the intrinsic properties of the adjustable lens can include any one or more of a focal length, a vertical image origin, a horizontal image origin, and a distortion parameter. The position of the fiducial marker can be determined on a three-dimensional grid. The calibration target can also be disposed on a mounting system. The mounting system can enable angular adjustment of the calibration target.

In a third aspect, the invention relates to a method for calculating intrinsic properties and an entry pupil location of an adjustable camera lens. The method includes providing a camera, such as one of the cameras described above, capturing an image, the image including a plurality of fiducial markers disposed along a length of a front surface of a calibration target, aligning the camera such that the center of the image corresponds with the position of a coordinate system origin, determining the position of each of the fiducial markers relative to the position of the coordinate system origin, and calculating the intrinsic properties and the entry pupil location of the adjustable lens based upon the position of each of the fiducial markers.

The camera includes an adjustable lens. The adjustable lens includes ring members for manipulating any one or more of a focal length, a focus distance, and an iris position. The adjustable lens further includes sensor members corresponding to each of the ring members. The sensor members collect data corresponding to the position of the adjustable lens. The intrinsic properties of the adjustable lens include any one or more of a focal length, a vertical image origin, a horizontal image origin, and a distortion parameter.

In one embodiment according to this aspect of the invention, the method comprises an image processor that includes a central processing unit, a memory connected to the central processing unit, a video card for processing the image, and at least one algorithm to calculate the intrinsic properties and the entry pupil location of the adjustable camera lens.

In general, a system according to the invention can include a rotating planar calibration target. To generate calibration information, specific physical locations on the planar calibration target can be correlated to specific pixels on the captured image. This is typically achieved with a printed grid or set of fiducial markers of known size that are mounted to the planar calibration target. In one embodiment, the planar calibration target has fiducial markers printed on it, which can be automatically recognized by a computer algorithm. The fiducial markers are each unique, and their location on the planar calibration target can be specified precisely using a coordinate system. Since the coordinate system can be specified, the origin of the coordinate system can be placed at an arbitrary location. For example, the coordinate system can be placed at the center of the front surface of the planar calibration target.

In order to calculate the entrance pupil location of the camera, the position of the planar calibration target can calculated with respect to the position of the physical camera sensor. This is achieved by aligning the center of the camera's image with the center of the calibration target. The calibration process calculates the entry pupil location with respect to the planar 2-D target. Since the distance from the physical camera sensor to the center of the calibration target can be easily measured, the distance from the center of the calibration target to the entry pupil location is known, and these measurements are in a line, the entry pupil offset from the camera sensor can be calculated by subtracting the entry pupil distance to the planar calibration target from the distance between the camera sensor and the planar calibration target. This last distance must be measured manually. For example, this measurement can easily be measured using a tape measure or a laser range finder.

Lenses with adjustable focal lengths are common in television and motion picture production and are known as zoom lenses. As the focal length is increased, the area of the target is magnified. To keep a sufficient number of fiducial markers visible for calibration purposes, a variety of marker sizes must be used. In one embodiment, the marker sizes decrease as the distance to the origin of the calibration target decreases, which provide a higher concentration of target markers at the center of the rotating target.

For planar calibration targets, multiple views of the target are required to solve for all of the intrinsic camera parameters. To achieve this, either the camera or the calibration target must be moved between image captures. In one embodiment, the planar target is pivoted such that the axis of rotation extends through the origin of the fiducial marker coordinate system. To provide automatic motion of the planar calibration target, the planar calibration target is moved with a motor connected to a speed reduction gearbox. The center of the calibration target could also be set to a constant distance by physically connecting it to the camera's sensor origin location by a wire or cord of known length. The center of the calibration target could also be known by being measured with an external 3-D positioning device, such as a motion capture system. The adjustment of the camera lens can be achieved automatically via computer control of motors connected to the lens adjustment rings. The distance between the camera and the optical calibration target can be adjusted automatically by moving the camera or target back and forth along a motorized rail.

These and other objects, along with advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DESCRIPTION

In general, the invention relates to systems and methods for the rapid, efficient, and reliable calculation of intrinsic properties and an entry pupil location of an adjustable camera lens, which dramatically speeds the integration of live action and virtual composite images.

Applications ranging from video games to feature films can implement the systems and methods for a fraction of the cost of attempting to calculate the lens parameters using the typical methods of placing background markers placed behind the live action subject being photographed and solving for the camera lens parameters separately for each individual shot. The systems and methods greatly reduce the cost and complexity of matching camera motion, and enable a much wider usage of the virtual production method.

Figure 1:
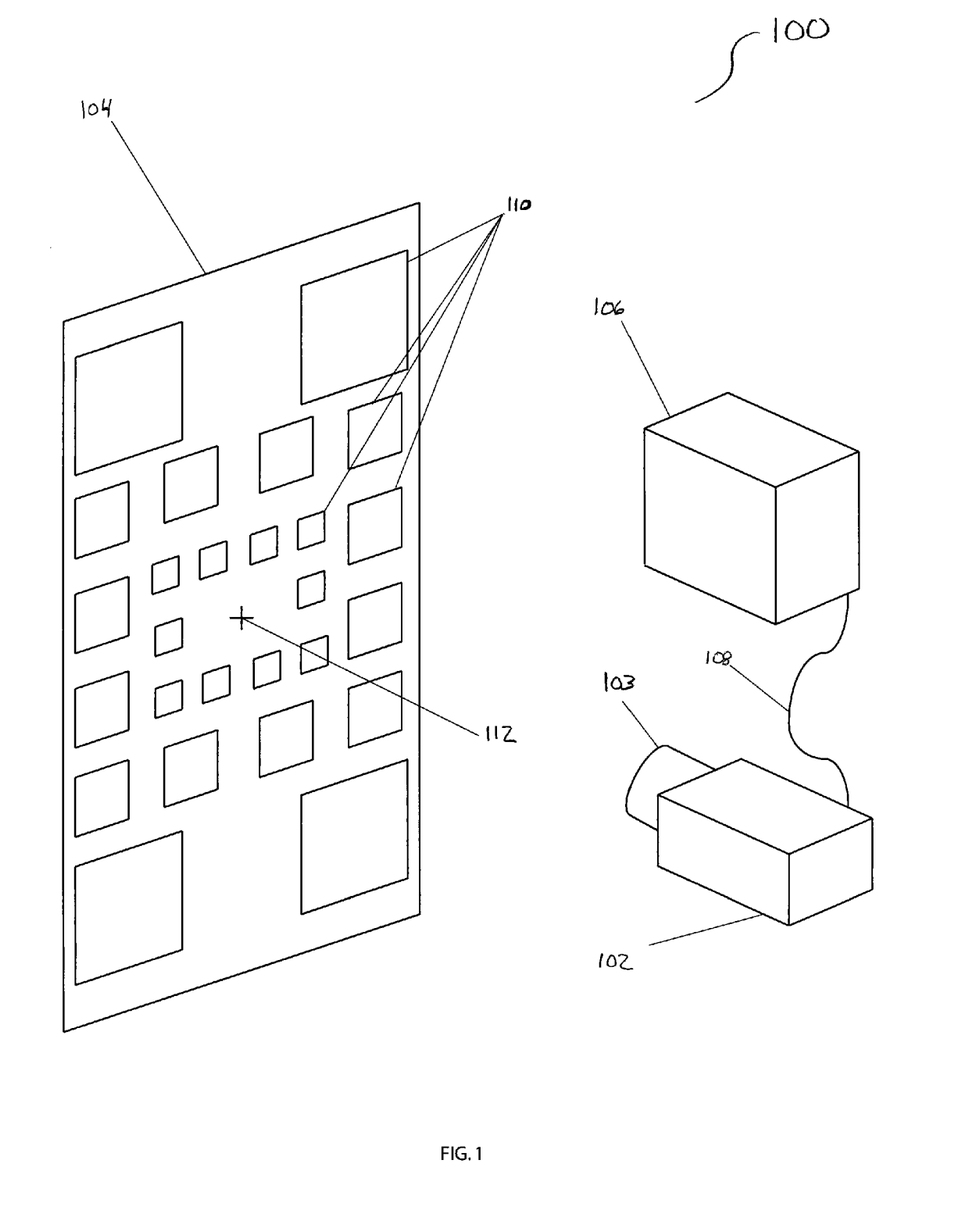
FIG. 1 is a perspective view of an embodiment of a system for calculating intrinsic properties and an entry pupil location of an adjustable camera lens.

Referring to FIG. 1, in one embodiment according to the invention, a system 100 includes a camera 102 and a planar calibration target 104. The camera 102 includes an adjustable lens 103. The camera 102 is positioned to capture an image of the planar calibration target 104.

The system 100 can also includes an image processor 106. The image processor 106 can include a central processing unit, a memory connected to the central processing unit, and a video card for processing images taken by the camera 102. Images taken by the camera 102 can be transferred to the image processor 106 via, for example, a data cable 108. The images can also be transferred wirelessly between the camera 102 and the image processor 106. In one embodiment, the image processor 106 is a portable computer with a video capture card.

The planar calibration target 104 includes at least one fiducial marker 110. A plurality of fiducial markers 110 can also be provided on the planar calibration target 104. The fiducial markers 110 can a bar-code type pattern in order to be individually recognized by the image processor 106.

The fiducial markers 110 can be applied to the surface of the planar calibration target 104 using a variety of techniques, including printing, silk screening, and adhesive bonding. In one embodiment, the fiducial markers 110 are printed on a large format printer and bonded to the surface of the planar calibration target 104.

The fiducial markers 110 can be arranged in a pattern on the surface of the planar calibration target 104 such that their location on the planar calibration target 104 is derived in three-dimensional grid coordinates (X-Y-Z).

Each fiducial marker 110 can be unique and can be assigned a unique X-Y-Z position on the planar calibration target 104 with respect to a coordinate system origin 112. For example, the coordinate system origin 112 can be place anywhere on the planar calibration target 104.

In one embodiment, the coordinate system origin 112 is placed at the center of the front surface of the planar calibration target. Camera 102 is positioned such that the coordinate system origin 112 of the fiducial markers 110 is located at the center of the visible image. The size and layout of the fiducial markers 110 is designed to maximize the number of fiducial markers 110 that can be seen at a given time by the camera 102. Since the visible area of calibration target 104 decreases as the adjustable lens 103 is zoomed in, it is desirable is to have the fiducial markers 110 be of decreasing size as they approach the coordinate system origin 112.

Figure 2:
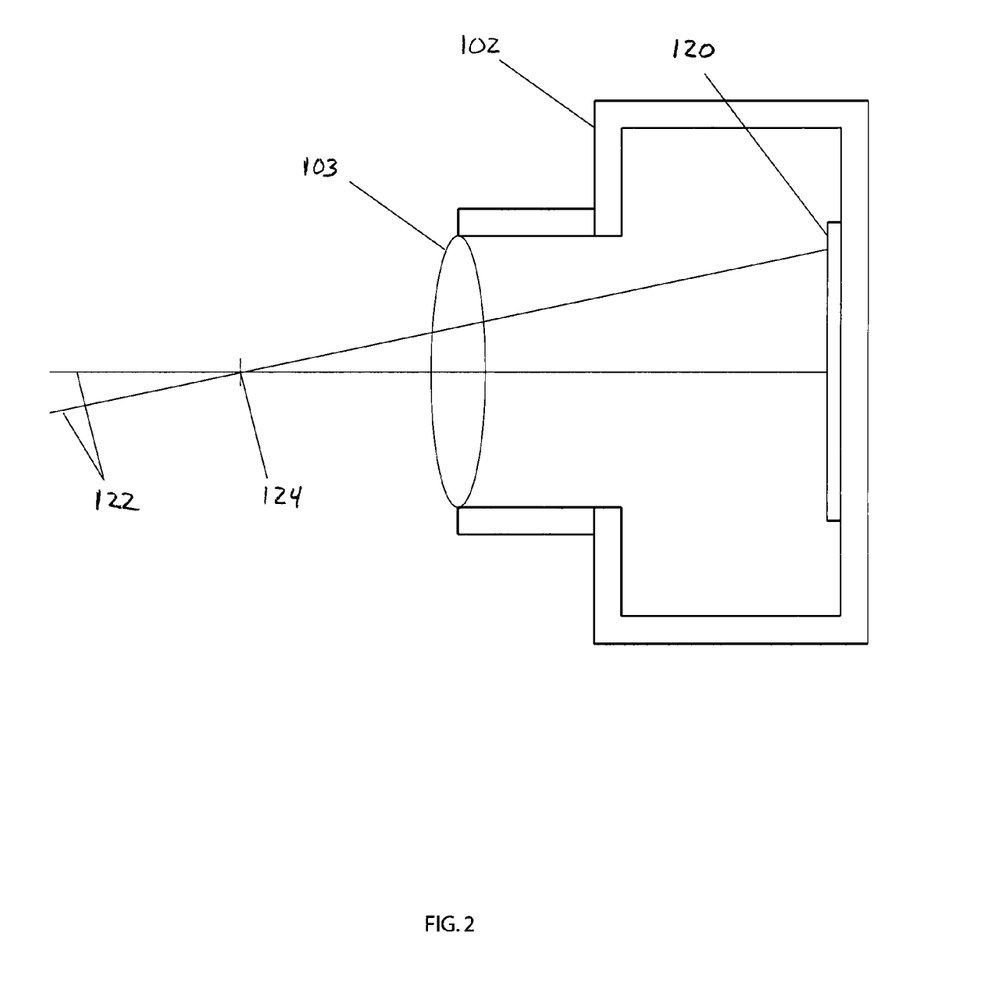
FIG. 2 is a plan view of a camera of the system of FIG. 1.

Referring now to FIG. 2, the camera 102 of FIG. 1 includes an adjustable lens 103 and an image sensor 120. In operation, the adjustable lens 103 receives incoming light rays 122 and causes the incoming light rays 122 to bend and converge at a single entry pupil location 124 before striking the image sensor 120. The distance between the image sensor 120 and the entry pupil location 124, called the entry pupil distance, is one of the internal optical parameters of adjustable lens 103.

Figure 3:
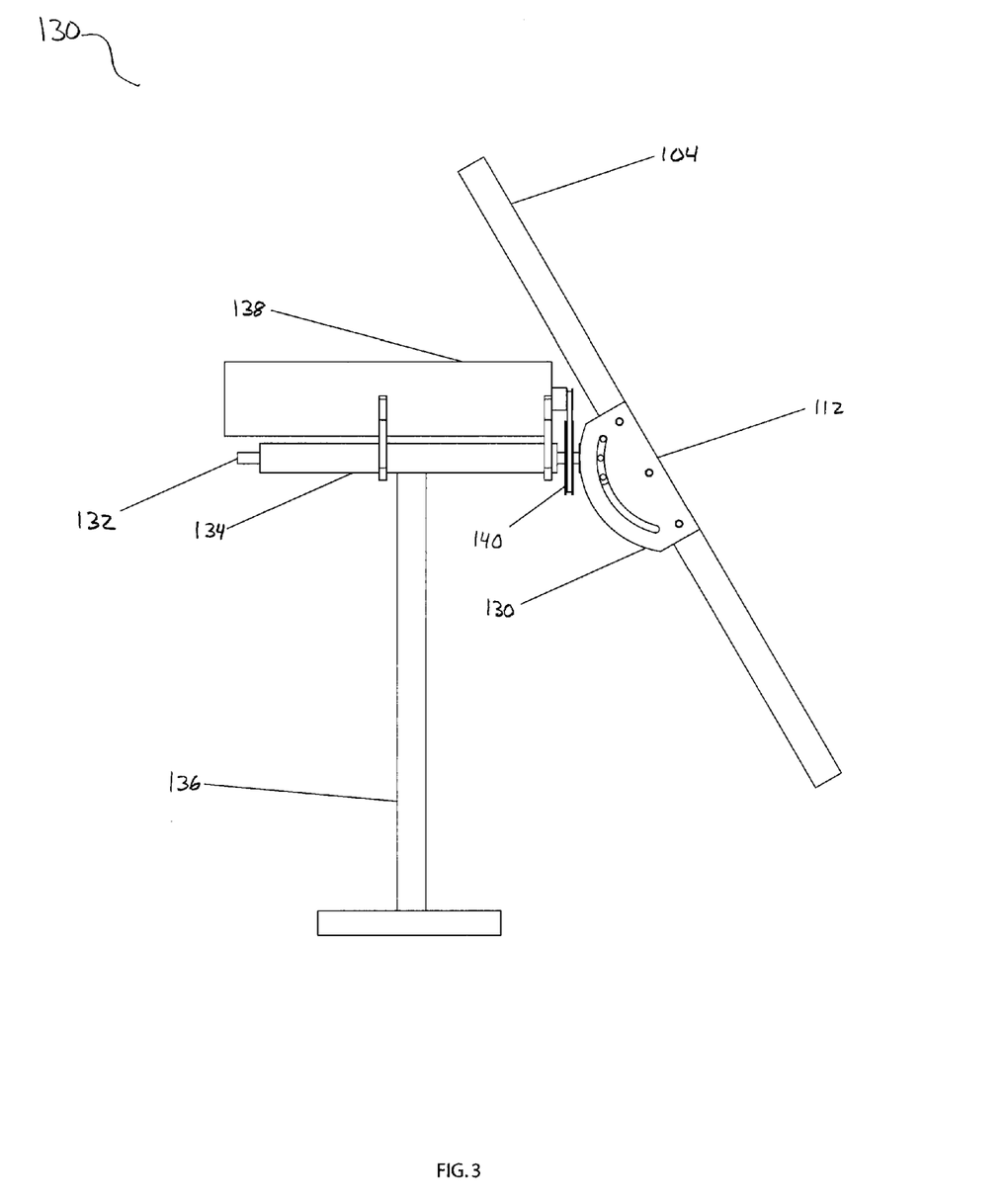
FIG. 3 is a side view of a mounting system.

Referring to FIGS. 1-3, a means for generating multiple images of the planar calibration target 104 at separate visible angles with respect to the camera 102 is provided in the form of a mounting system 130. The mounting system 130 includes the planar calibration 104, the coordinate system origin 112, an angular mount 130, a shaft 132, a housing 134, a stand 136, a motor, 138, and a reduction pulley 140.

In operation, the planar calibration target 104 is attached to the angular mount 130, which enables angular adjustment of the target 104 with respect to the camera 102. The angular mount 130 is designed such that its rotary axis coincides with the coordinate system origin 112. The angular mount 130 is connected to the shaft 110, which rotates the housing 134. The housing 134 is supported by the stand 136. In one embodiment, the stand 136 is a 'C stand' of the type which is commonly used on motion picture and television production stages. The shaft 132 is spun by the motor 138 through the reduction pulley 140, which provides a slow, steady rotation of the planar calibration target 104 about the coordinate system origin 112. In this manner, as the planar calibration target 104 rotates, the coordinate system origin 112 remains at a constant distance from the camera 102.

Referring now to FIGS. 1-4, the calculation of a camera's intrinsic parameters can be achieved with a series of steps. In one embodiment, an image 150 of the fiducial markers 110 is captured. The camera 102 is aligned such that the center of the image 150 coincides with the center of the coordinate system origin 112.

Figure 4:
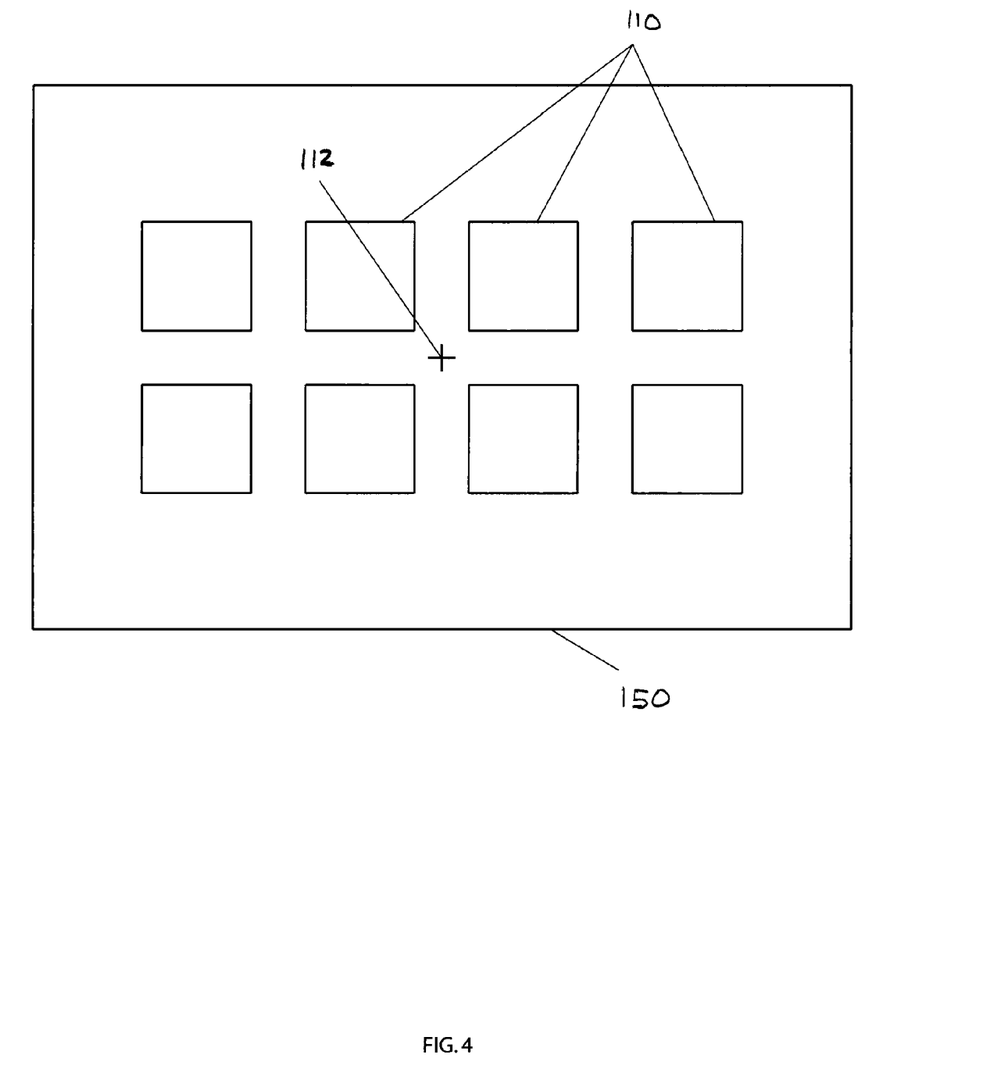
FIG. 4 is a plan view of a captured image of the system of FIG. 1.

The first set of calibration mathematics necessary to calculate the intrinsic parameters requires several of the images 150 to be captured by the camera 102, with the planar calibration target 104 presented at various angles relative to the camera 102 and the adjustable lens 103. For example, at least fifteen images of the planar calibration target 104 can be taken for each individual setting of the adjustable lens 103.

The horizontal (X) and vertical (Y) location of the centers of the fiducial markers 110 in the image 150 is then calculated. For example, the X-Y locations can be calculated by a set of computer algorithms, such as those known in the computer vision field, and can be readily solved by the use of standard software libraries. In one embodiment, the software library used to calculate the centers of the fiducial markers 110 in the image 150 is the MFD6 system by Millennium Three Engineering. This calculation can be executed on the image processor 106.

For each recognized fiducial marker 110, its position on the planar calibration target 104 can then be calculated. In one embodiment, this can be achieved by a simple file that links the fiducial marker's 110 X-Y coordinates to an X-Y-Z coordinate on the planar calibration target 104. For example, the coordinate system can be a simple Cartesian X-Y-Z coordinate system with the coordinate system origin 112 at the center of the planar calibration target 104. Each fiducial marker 110 can have a unique X and Y location on the planar calibration target 104, with the Z coordinate for all targets set to 0.

The calculation of lens distortion can also be taken into account when determining the camera's intrinsic properties. Lens distortion is the amount by which a physical lens departs from the behavior of an ideal lens. In one embodiment, the distortion is modeled by the corrected position of the object on the image sensor plane using the following method:

$$X\text{distorted} = X\text{undistorted} * (1 + k1 * \text{radius}2)$$

$$Y\text{distorted} = Y\text{undistorted} * (1 + k1 * \text{radius}2)$$

In this calculation, the radius is the distance from the center of the image sensor 120 to the undistorted X-Y position of the pixel. Optionally, multiple distortion parameters can be used to model highly distorted lenses, such as extremely wide angle lenses. In this embodiment, a single distortion parameter, k1, is used.

Once a set of the three-dimensional (3-D) physical coordinates and their associated X-Y coordinates on the image 150 are calculated, multiple methods may be used to determine the intrinsic camera parameters, including the focal length, optical image center location on the image sensor 120, and distortion parameter k1. This calculation can be performed by any number of standard imaging libraries. For example, this calculation can be solved by the cvCalibrateCamera2 function in the OpenCV library from Intel Corporation of Santa Clara, Calif. USA. The cvCalibrateCamera2 function takes as inputs the set of X-Y-Z coordinates and their associated X-Y coordinates on the image sensor 120, and generates the following intrinsic lens parameters:

Focal Length (in pixels)
Vertical Image Origin (in pixels)
Horizontal Image Origin (in pixels)
Distortion k1

In one embodiment, the dimensions of the focal length and the vertical and horizontal image origins are converted to physical dimensions to be used in modeling the camera 102. In order to convert pixels to millimeters, the physical size of the image sensor 120 is calculated, as well as the number of pixels on that size. These values are commonly published in the specifications of the camera. To convert the focal length in pixels to a focal length in millimeters, the following calculation is used:

$$\text{Focal Length(mm)} = \text{Focal Length(pixels)} * \text{Sensor size (mm)} / \text{Sensor Pixels}$$

Once these intrinsic lens parameters are determined, the entry pupil location 124 can be calculated. The calculation of the entry pupil location 124 may require the distance between the image sensor 120 and the coordinate system origin 112 to be determined. Most video or motion picture cameras have the physical location of the image sensor 120 marked on the side of the camera's 102 body for use as a focus reference, thereby making it simple to measure from this point to the coordinate system origin 112 at the center of the planar calibration target 104. In one embodiment, this calculation is measured with a measuring tape or laser range finder.

For each orientation of the planar calibration target 104 captured in the image 150, the position of the entry pupil location 124 with respect to the coordinate system origin 112 can be calculated using, for example, a standard pose estimation technique. In one embodiment, the position can be calculated through the cvFindExtrinsicCameraParams2 function in the Intel OpenCV software library. This function takes as inputs the X-Y-Z coordinates of the fiducial markers 110 on the planar calibration target 104 and the locations on the image 150 of the centers of the fiducial markers 110 for each separate image 150, as well as the previously calculated intrinsic lens parameters and lens distortion parameters. This function can subsequently generate the position in X-Y-Z coordinates of the entry pupil location 124 with respect to the coordinate system origin 112.

Once the center of the adjustable lens 103 is aligned with the coordinate system origin 112, the entry pupil location 124 will be in-line between the image sensor 120 and the coordinate system origin 112. The position of the entry pupil location 124 can then be calculated by subtracting the distance between the coordinate system origin 112 to the entry pupil location 124 from the distance between the coordinate system origin 112 to the image sensor 120. In one embodiment, the distance from the coordinate system origin 112 to the entry pupil location 124 can be calculated from the X-Y-Z coordinates of the entry pupil location 124 by the cvFindExtrinsicCameraParams2 function with the following calculation:

$$\text{Distance} = \text{sqrt}(x2 + y2 + z2)$$

Referring now to FIGS. 1-5, the complete intrinsic parameters and the entry pupil distance can be solved for a representative number of data points that are sampled through a range of the adjustable lenses 103 and correlated to specific adjustment points.

Figure 5:
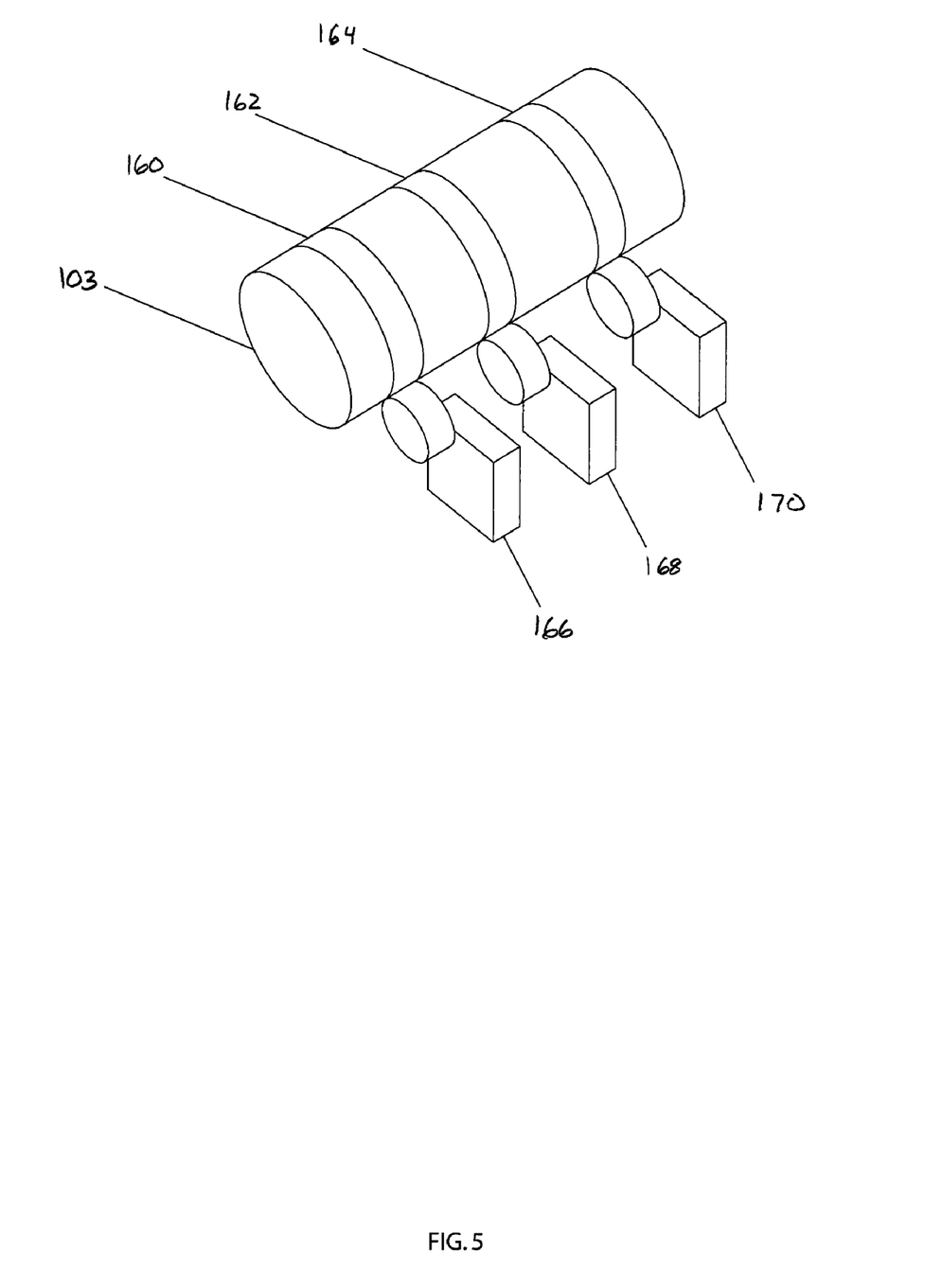
FIG. 5 is a perspective view of adjustable lens with ring members and sensors attached thereto.

The adjustable lenses 103 enable adjustment of the focal length, the focus distance, and the iris positions through an adjustable focus ring 160, an adjustable focal length ring 162, and an adjustable iris ring 164. The positions of the adjustment rings 160, 162, and 164 can be measured with a focus sensor 166, a focal length sensor 168, and an iris sensor 170. These may be combined with motors for a lens sensing and control package.

In one embodiment, the lens sensing and control package is a lens motor system made by Preston Cinema Systems of Santa Monica, Calif. The lens data from the ring sensors 166, 168, and 170 can be transmitted to the image processor 106 through a data connection.

It is understood that not all lenses have adjustable parameters in each of these areas. Therefore, in one embodiment, an adjustable lens 103 only has the adjustable focus distance ring 160 and the adjustable iris ring 164.

In operation, as the sensors 166, 168, and 170 are frequently changed from one production another, it is advantageous to convert the raw data values calculated by these sensors into a normalized value from 0 to 1, where 0 represents the position of the lens control rings 160, 162, and 164 at their minimum position, and 1 represents the position of the lens control rings 160, 162, and 164 at their maximum position. In this way, a lens calibration file can be used with the adjustable lens 103 that it was made for even if a different set of the lens position sensors 166, 168, and 170 are used.

The result of this operation is a set of measurements that can cover the range of adjustments. The measurement takes the form of internal lens values at specific points of lens adjustment. To cover the areas between specific data points, the data must be interpolated properly. In one embodiment, this is achieved with linear interpolation.

In various embodiments of the invention, motorized lens sensors can be included to automatically iterate through multiple lens positions. In this way, the lens could be placed at a distance from the target, and the lens focus can be set to keep the center of the optical calibration target in focus. The motorized lens focal length sensor would gradually zoom in on the target, stop, and trigger a set of calibration images to be captured. The motorized lens focal length sensor would then move forward a small increment, and repeat the calibration process until the entire focal length range had been calibrated for that specific focus distance. The camera would then be moved to a new focus distance from the optical calibration target center, and the process started again. In this way, the laborious process of taking hundreds of separate lens measurements can be heavily automated. Additional alternative embodiments can include the automated movement of the camera away from the optical target, so that the complete range of focal length and focus distance measurements could be generated automatically.

It will be understood that various modifications may be made to the embodiments disclosed herein. Therefore, the above description should not be construed as limiting, but merely as illustrative of some embodiments according to the invention.

What is claimed is:

1. A system for calculating intrinsic properties and an entry pupil location of an adjustable camera lens comprising:
    a camera for capturing an image, the camera including an adjustable lens
    a calibration target having a front surface, the calibration target including a fiducial marker disposed along a length of the front surface, the fiducial marker encoded with an identifier which uniquely identifies a position of the fiducial marker relative to a coordinate system origin, the position of the fiducial marker used to calculate the intrinsic properties and the entry pupil location of the adjustable lens; and
    an image processor including a memory connected to a central processing unit and configured to calculate the entry pupil location of the camera lens.

2. The system of claim 1 further comprising a mounting system for enabling angular adjustment of the calibration target.

3. The system of claim 2, wherein the angular adjustment is made relative to a position of the camera.

4. The system of claim 1 wherein the intrinsic properties of the adjustable lens include any one or more of a focal length, a vertical image origin, a horizontal image origin, and a distortion parameter.

5. The system of claim 1 wherein the position of the fiducial marker is calculated on a three-dimensional grid.

6. The system of claim 1 wherein the identifier of the fiducial marker is a bar-code type pattern.

7. The system of claim 1 further comprising a plurality of fiducial markers disposed along the length of the front surface, wherein the coordinate system origin is aligned with the axis of the adjustable lens.

8. The system of claim 1 wherein the adjustable lens includes ring members for adjusting any one or more of focal length, focus distance, and iris position.

9. The system of claim 8 further comprising sensor members corresponding to each of the ring members that collect data based upon the position of the adjustable lens.

10. A method for calculating intrinsic properties and an entry pupil location of an adjustable camera lens comprising:
    providing a camera, the camera including an adjustable lens;
    capturing an image, the image including at least one fiducial marker disposed along a length of a front surface of a calibration target, the fiducial marker encoded with an identifier which uniquely identifies a position of the fiducial marker relative to a coordinate system origin disposed on the calibration target;
    aligning the camera such that the center of the image corresponds with the position of a coordinate system origin;
    determining the position of the fiducial marker relative to the position of the coordinate system origin; and
    calculating the intrinsic properties and the entry pupil location of the adjustable lens based upon the position of the fiducial marker.

11. The method of claim 10 further comprising an image processor including a central processing unit, a memory connected to the central processing unit, and a video card for processing the image.

12. The method of claim 11 wherein the image processor includes at least one algorithm to calculate the intrinsic properties and the entry pupil location of the adjustable camera lens.

13. The method of claim 10 wherein the intrinsic properties of the adjustable lens include any one or more of a focal length, a vertical image origin, a horizontal image origin, and a distortion parameter 14. The method of claim 10 wherein the position of the fiducial marker is determined on a three-dimensional grid.

15. The method of claim 10 wherein the calibration target is disposed on a mounting system.

16. The method of claim 15 wherein the mounting system enables angular adjustment of the calibration target.

17. A method for calculating intrinsic properties and an entry pupil location of an adjustable camera lens comprising:
    providing a camera, the camera including an adjustable lens, the adjustable lens including ring members for manipulating any one or more of a focal length, a focus distance, and an iris position, the adjustable lens further including sensor members corresponding to each of the ring members, the sensor members collecting data corresponding to the position of the adjustable lens;
    capturing an image, the image including a plurality of fiducial markers disposed along the length of a front surface of a calibration target, each of the fiducial markers encoded with an identifier which uniquely identifies a position of each of the fiducial markers relative to a coordinate system origin disposed on the calibration target;
    aligning the camera such that the center of the image corresponds with the position of a coordinate system origin;
    determining the position of each of the fiducial markers relative to the position of the coordinate system origin; and
    calculating the intrinsic properties and the entry pupil location of the adjustable lens based upon the position of each of the fiducial markers, the intrinsic properties of the adjustable lens including any one or more of a focal length, a vertical image origin, a horizontal image origin, and a distortion parameter.

18. The method of claim 17 further comprising an image processor including a central processing unit, a memory connected to the central processing unit, a video card for processing the image, and at least one algorithm to calculate the intrinsic properties and the entry pupil location of the adjustable camera lens.

19. A method for calculating an entry pupil location of a camera, the method comprising:
    positioning a calibration target a known distance from a lens of a camera, wherein a plurality of fiducial markers appear at known locations on the calibration target;
    capturing, with the camera, multiple images of the calibration target at different angles;

determining, for each image, using a processor coupled to a memory, coordinates of the imaged fiducial markers within the image and coordinates of the fiducial markers on the angled calibration target; and calculating, using the processor, an entry pupil location of the camera based on the determined coordinates.

* * * * *